(12) United States Patent
Martz et al.

(10) Patent No.: US 11,808,195 B1
(45) Date of Patent: Nov. 7, 2023

(54) SYSTEM AND METHOD FOR DOSING A SELECTIVE CATALYTIC REDUCTION CATALYST

(71) Applicant: Ford Global Technologies, LLC, Dearborn, MI (US)

(72) Inventors: Jason Martz, Canton, MI (US); Paul Joseph Tennison, West Bloomfield, MI (US); Eric Matthew Kurtz, Dearborn, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/806,377

(22) Filed: Jun. 10, 2022

(51) Int. Cl.
*F01N 3/20* (2006.01)
*B60W 20/16* (2016.01)
(Continued)

(52) U.S. Cl.
CPC ......... *F01N 3/208* (2013.01); *B01D 53/9418* (2013.01); *B60W 10/06* (2013.01);
(Continued)

(58) Field of Classification Search
CPC ...... F01N 3/0842; F01N 3/029; F01N 3/0293; F01N 3/0814; F01N 3/0871; F01N 3/0885; F01N 3/108; F01N 3/206; F01N 3/2066; F01N 3/2013; F01N 3/2073; F01N 3/208; F01N 3/323; F01N 2250/12; F01N 2570/14; F01N 2570/18; F01N 2610/00; F01N 2610/01; F01N 2610/02; F01N 2610/03; F01N 2610/04; F01N 2610/05; F01N 2610/06; F01N 2610/102; F01N 2610/1453; F01N 2610/146; F01N 2900/04; F01N 2900/10; F01N 2900/14; F01N 2900/1402; F01N 2900/1404; F01N 2900/1406; F01N 2900/1602; F01N 2900/1616; F01N 2900/18; F01N 2900/1806; B01D 53/90; B01D 53/94; B01D 53/9404; B01D 53/9409; B01D 53/9418; B01D 53/9422; B01D 53/9431; B01D 53/9436; B01D 53/9477; B01D 2251/00; B01D 2251/20; B01D 2251/206; B01D 2251/2062; B01D 2251/2065; B01D 2251/2067; B01D 2252/102; B01D 2257/40; B01D 2257/404; B01D 2257/406; B01D 2321/2041;
(Continued)

(56) References Cited

U.S. PATENT DOCUMENTS 8,356,472 B2   1/2013   Hiranuma et al.
10,900,447 B2  1/2021   Hu et al.
(Continued)

FOREIGN PATENT DOCUMENTS

JP   2009113580 A    5/2009
WO   2020192973 A1   10/2020

*Primary Examiner* — Binh Q Tran
(74) *Attorney, Agent, or Firm* — Vincent Mastrogiacomo; McCoy Russell LLP

(57) ABSTRACT

Methods and systems for improving NOx conversion efficiency of a selective catalytic reduction catalyst are described. In one example, an amount of $NH_3$ stored in a SCR is adjusted after stopping an engine so that a desired amount of $NH_3$ may be stored within the SCR when the engine is restarted.

14 Claims, 4 Drawing Sheets

(51) Int. Cl.

| | |
|---|---|
| *F02D 41/00* | (2006.01) |
| *F02D 41/02* | (2006.01) |
| *F01N 3/32* | (2006.01) |
| *B60W 10/06* | (2006.01) |
| *B01D 53/94* | (2006.01) |
| *B60W 10/08* | (2006.01) |
| *F01N 3/029* | (2006.01) |
| *F01N 3/18* | (2006.01) |
| *F01N 3/08* | (2006.01) |

(52) U.S. Cl.
CPC ............ *B60W 10/08* (2013.01); *B60W 20/16* (2016.01); *F01N 3/2013* (2013.01); *F01N 3/323* (2013.01); *F02D 41/0002* (2013.01); *F02D 41/0235* (2013.01); *F01N 3/0293* (2013.01); *F01N 3/0885* (2013.01); *F01N 2250/12* (2013.01); *F01N 2570/18* (2013.01); *F01N 2610/02* (2013.01); *F01N 2610/146* (2013.01); *F01N 2610/1453* (2013.01); *F01N 2900/04* (2013.01); *F01N 2900/10* (2013.01); *F01N 2900/1402* (2013.01); *F01N 2900/1406* (2013.01); *F01N 2900/1602* (2013.01); *F01N 2900/1616* (2013.01); *F01N 2900/18* (2013.01)

(58) Field of Classification Search
CPC ............. F02D 41/0002; F02D 41/0235; F02D 41/042; F02D 41/045; F02D 41/107; F02D 41/10; F02D 41/12; F02D 2013/0292; B60W 10/06; B60W 10/08; B60W 20/16
See application file for complete search history.

(56) References Cited

U.S. PATENT DOCUMENTS

| | | | |
|---|---|---|---|
| 11,148,657 | B2 | 10/2021 | Slottskog et al. |
| 11,391,192 | B1* | 7/2022 | Harris ........................ F01N 9/00 |
| 2010/0268438 | A1* | 10/2010 | Hiranuma ............. B60W 20/00 60/303 |
| 2012/0036838 | A1* | 2/2012 | Furuya .................... F01N 3/208 60/285 |
| 2015/0204228 | A1* | 7/2015 | Hayashi .................. F01N 3/208 60/276 |
| 2016/0082949 | A1 | 3/2016 | Jang |
| 2017/0350294 | A1* | 12/2017 | Asaura .................... F01N 9/002 |
| 2018/0274419 | A1* | 9/2018 | Sakuma ............. B01D 53/9409 |
| 2019/0226373 | A1* | 7/2019 | Fukuda .............. B01D 53/9422 |
| 2019/0299974 | A1 | 10/2019 | Rauch et al. |
| 2020/0116060 | A1* | 4/2020 | Suzuki .............. B01D 53/9409 |
| 2020/0332730 | A1 | 10/2020 | Andersson |

\* cited by examiner

SYSTEM AND METHOD FOR DOSING A SELECTIVE CATALYTIC REDUCTION CATALYST

BACKGROUND/SUMMARY

A selective catalytic reduction (SCR) catalyst may be applied to reduce NOx emissions of a vehicle. SCR catalyst efficiency may be influenced by an amount of $NH_3$ that is stored within a washcoat of the SCR catalyst. The amount of $NH_3$ that is stored within the SCR catalyst may be reduced during some operating conditions, such as when an engine upstream of the SCR catalyst is operated at higher engine loads where NOx generation by the engine may increase. The amount of $NH_3$ that is consumed within the SCR catalyst may be replenished by injecting urea upstream of the SCR catalyst while an engine is rotating and combusting fuel. Even so, there may be times when the amount of $NH_3$ that is stored in the SCR catalyst may be lower than a desired value. One such time may be during cold engine starts. If an engine is cold started and storage of $NH_3$ in a SCR catalyst of the engine's exhaust system is low, NOx emissions of the engine may be higher than desired. Therefore, it may be desirable to provide a way to improve storage of $NH_3$ within a SCR catalyst.

The inventors herein have recognized the above-mentioned disadvantages and have developed a vehicle operating method, comprising: via a controller, supplying urea to a selective catalytic reduction (SCR) catalyst in response to a vehicle being in an off state and a temperature of the SCR catalyst being within a predetermined temperature range.

By dosing a SCR catalyst with urea when a vehicle is in an off state, it may be possible to provide the technical result of improving SCR catalyst efficiency when an engine upstream of the SCR catalyst is cold started. In particular, an amount of $NH_3$ that is stored in a SCR catalyst affects efficiency of the SCR catalyst. If too little $NH_3$ is stored within the SCR catalyst during a cold engine start, NOx generated by the engine may flow through the SCR catalyst untreated. Consequently, vehicle emissions may increase. However, the amount of $NH_3$ that is stored in a SCR catalyst after a vehicle is in an off state may be increased so that the efficiency of the SCR catalyst may be increased when the engine is restarted. In this way, the SCR catalyst may be dosed with urea without engine operation affecting $NH_3$ storage in the SCR catalyst before the engine is restarted.

The present description may provide several advantages. In particular, the approach may improve SCR catalyst efficiency during cold engine starting. In addition, the approach may adjust SCR catalyst operating conditions so that a desired amount of $NH_3$ may be stored in the SCR catalyst. Further, the approach may reduce a possibility of $NH_3$ slip during SCR catalyst dosing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
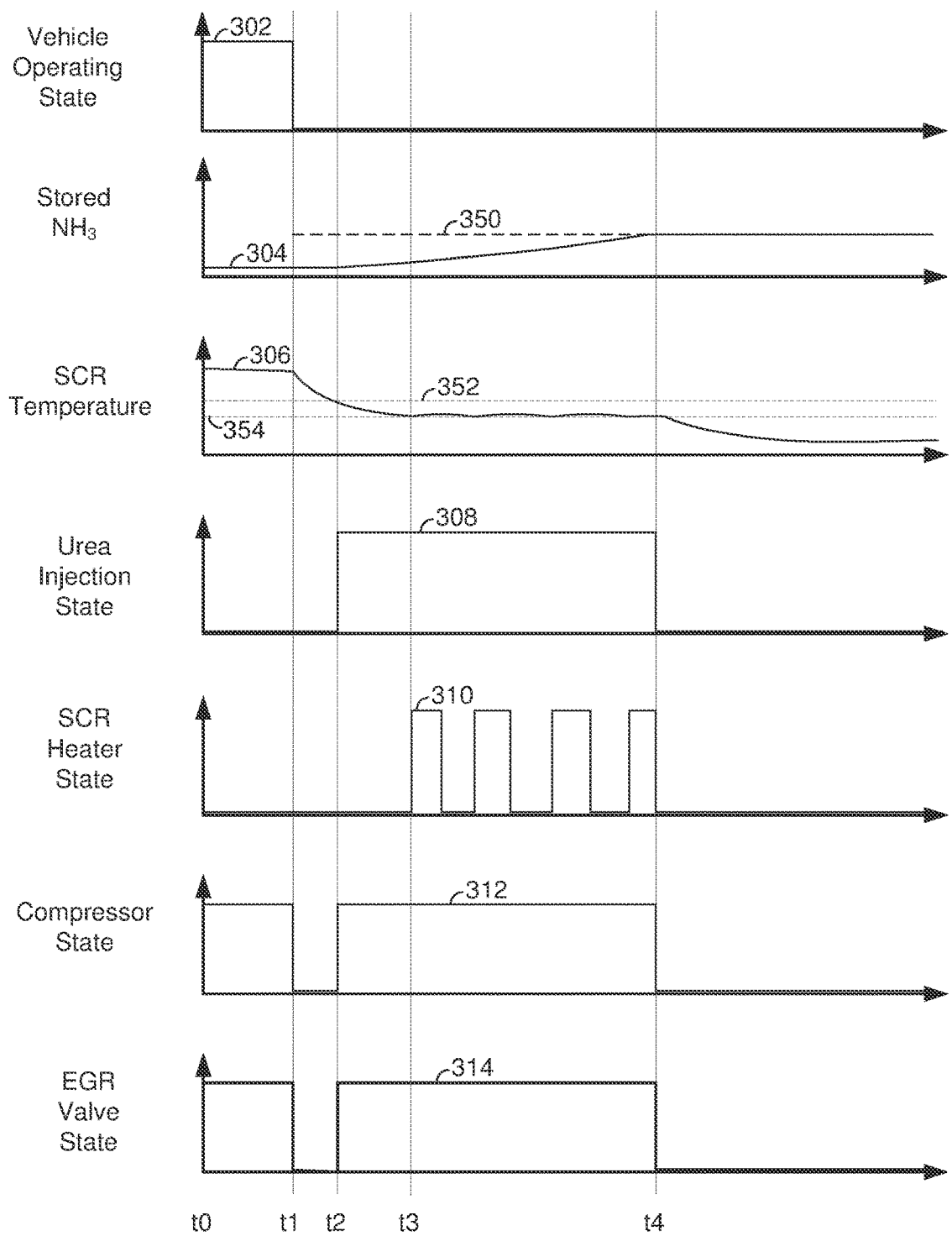
FIG. 3 shows an example prophetic engine operating sequences according to the present system and methods.
Figure 4:
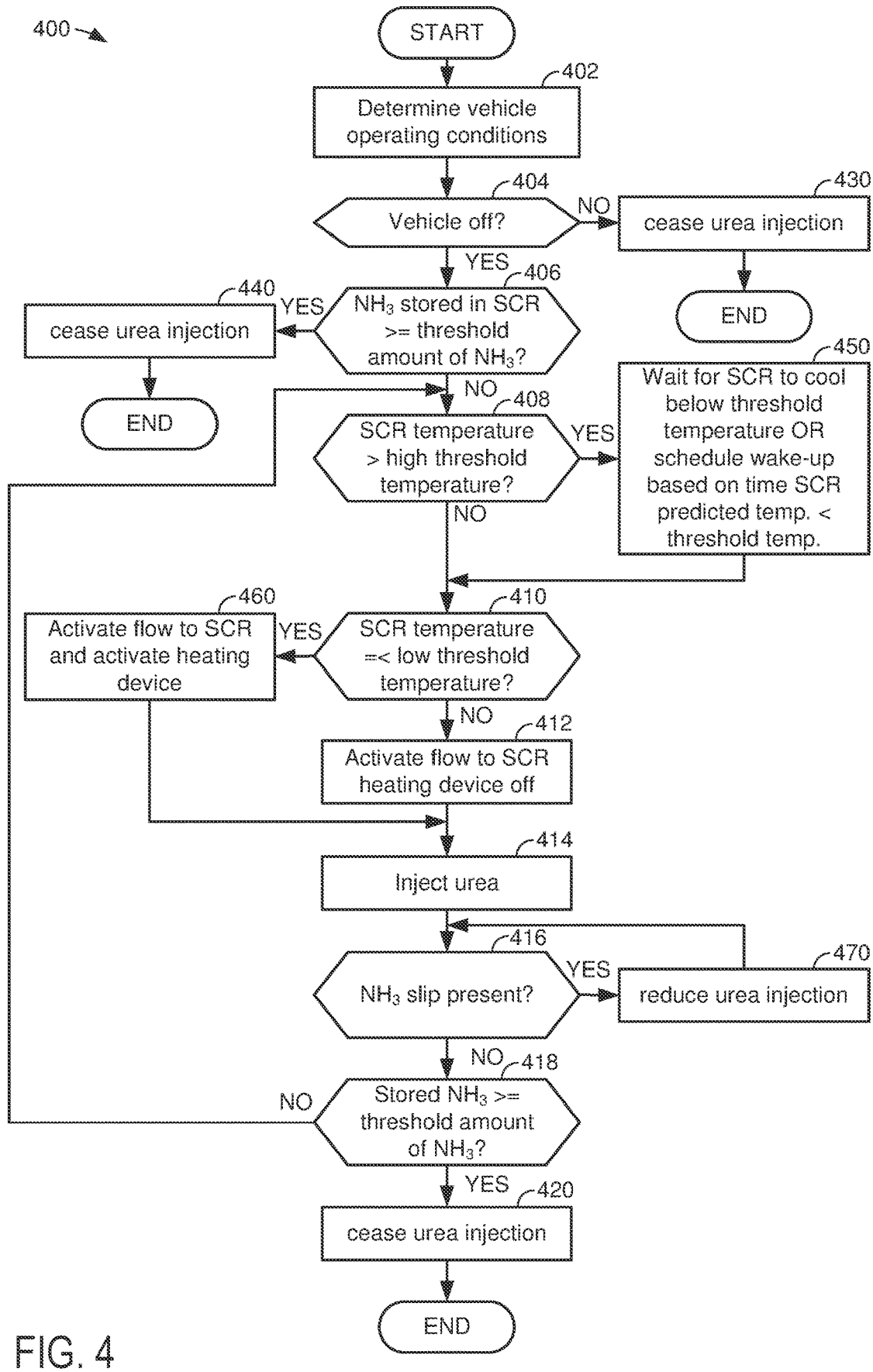
FIG. 4 shows an example method for operating vehicle that includes a SCR.

The present description is related to improving operation of a SCR catalyst. The systems and methods described herein may adjust an amount of $NH_3$ that is stored in the SCR catalyst during a time period just after an engine has stopped so that SCR catalyst temperature may be leveraged to store $NH_3$ within a SCR catalyst without having $NH_3$ be consumed when a vehicle's engine is not operating so that $NH_3$ storage may be maximized and so that the SCR catalyst is ready to convert NOx during a subsequent engine restart. Additionally, slip control of $NH_3$ during an engine off period is provided so that urea may be conserved. The present description may be applied to an engine of the type shown in FIG. 1 or a petrol engine. In addition, the engine may be included in a hybrid vehicle of the type shown in FIG. 2 or an alternate hybrid vehicle configuration. The system and method described herein may operate as shown in the sequence of FIG. 3. A flowchart of a method for controlling a vehicle is shown in FIG. 4.

Figure 1:
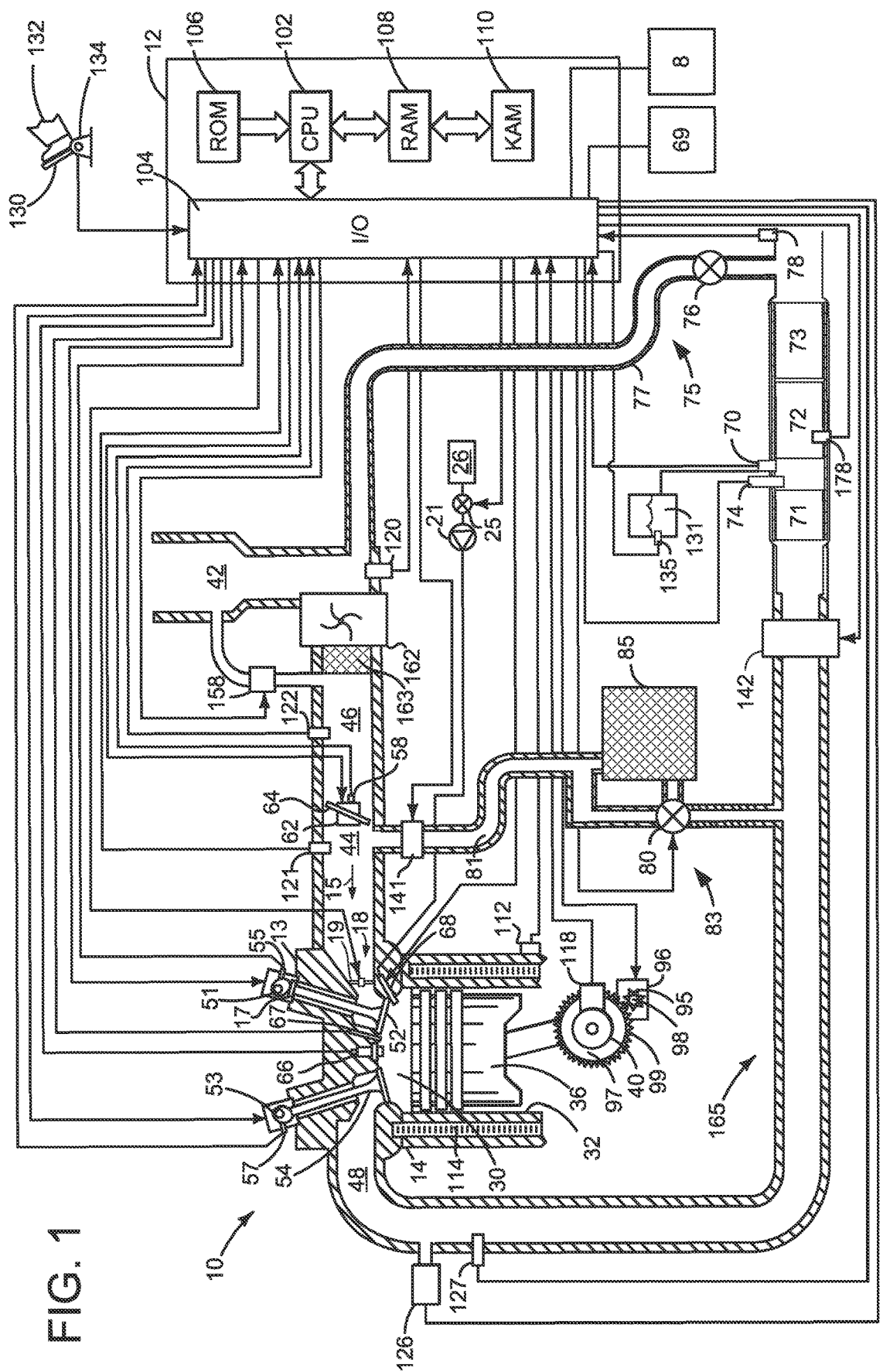
FIG. 1 shows a schematic depiction of an example engine.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake valve 52 may be held open during an entire cycle (e.g., four strokes) of engine 10 via decompression actuator 17. In one example, decompression actuator operates via providing negative lash. Engine 10 may optionally include a port throttle 19, which is positioned in intake port 18 downstream of central throttle 62 according to a direction of air flow into engine 10 as indicate by arrow 15. Port throttle 19 may selectively control flow of gases into and out of combustion chamber 30.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional central electronic throttle 62 which adjusts a position of throttle plate 64 to control air flow from intake boost chamber 46. Compressor 162 draws air from air intake 42 to supply boost chamber 46. Compressor 162 (e.g., an electrically driven compressor) may rotate and supply compressed air to boost chamber 46. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and controller 12 may monitor battery state of charge.

Combustion is initiated in the combustion chamber 30 when fuel automatically ignites when combustion chamber temperatures reach the auto-ignition temperature of the fuel when the piston 36 is near top-dead-center compression stroke. In some examples, a universal Exhaust Gas Oxygen (UEGO) sensor 126 may be coupled to exhaust manifold 48 upstream of exhaust gas after treatment device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures a glow plug 66 may convert electrical energy into thermal energy so as to create a hot spot next to one of the fuel spray cones of an injector in the combustion chamber 30. Cylinder pressure may be measured via pressure sensor 67.

Exhaust gas after treatment device 71 may include an oxidation catalyst and it may be followed by a SCR catalyst 72 and a diesel particulate filter (DPF) 73, in one example. In another example, SCR catalyst 72 may be positioned upstream of oxidation catalyst. NOx sensor 78 provides an indication of NOx in engine exhaust system 165. Exhaust system 165 includes exhaust manifold 48, after treatment device 71, SCR catalyst 72, diesel particulate filter 73, and the associated sensors. Urea 131 may be injected into exhaust system 165 via injector 70 and the urea 131 may be heated via a urea heater 135. Gases in exhaust system 165 may be heated via heater 74. Heater 74 may be an electrically operated heater or a combustion heater. Heater 74 may heat air and/or exhaust gas that flows through exhaust system 165. Temperature of SCR catalyst 72 may be determined via temperature sensor 178.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of exhaust gas after treatment device 71 to a location in the engine air intake system downstream of compressor 162. EGR may bypass EGR cooler 85, or alternatively, EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. A charge air cooler 163 may be provided downstream of compressor 162.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing driver demand pedal position adjusted by human foot 132; a measurement of engine manifold pressure (MAP) from pressure sensor 121 coupled to intake manifold 44; boost pressure from pressure sensor 122 exhaust gas oxygen concentration from oxygen sensor 126; exhaust manifold pressure from pressure sensor 127; an engine position sensor from an engine position sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

One or more devices may drive flow of gases through SCR 72 when the engine is not combusting fuel so that the SCR may be dosed with urea. Gas flow through SCR 72 may be driven via electrically driven compressor 162, a pump in the exhaust system 142 (e.g., an electrically driven turbocharger, air pump of an exhaust burner, or an auxiliary air pump within exhaust system 165), rotating engine 10 when engine 10 is not fueled (e.g., during coast down or motoring), and/or reversible exhaust gas recirculation pump 141. EGR value 80 may be fully open when flow of gases to SCR 72 is desired to increase flow to SCR 72.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Figure 2:
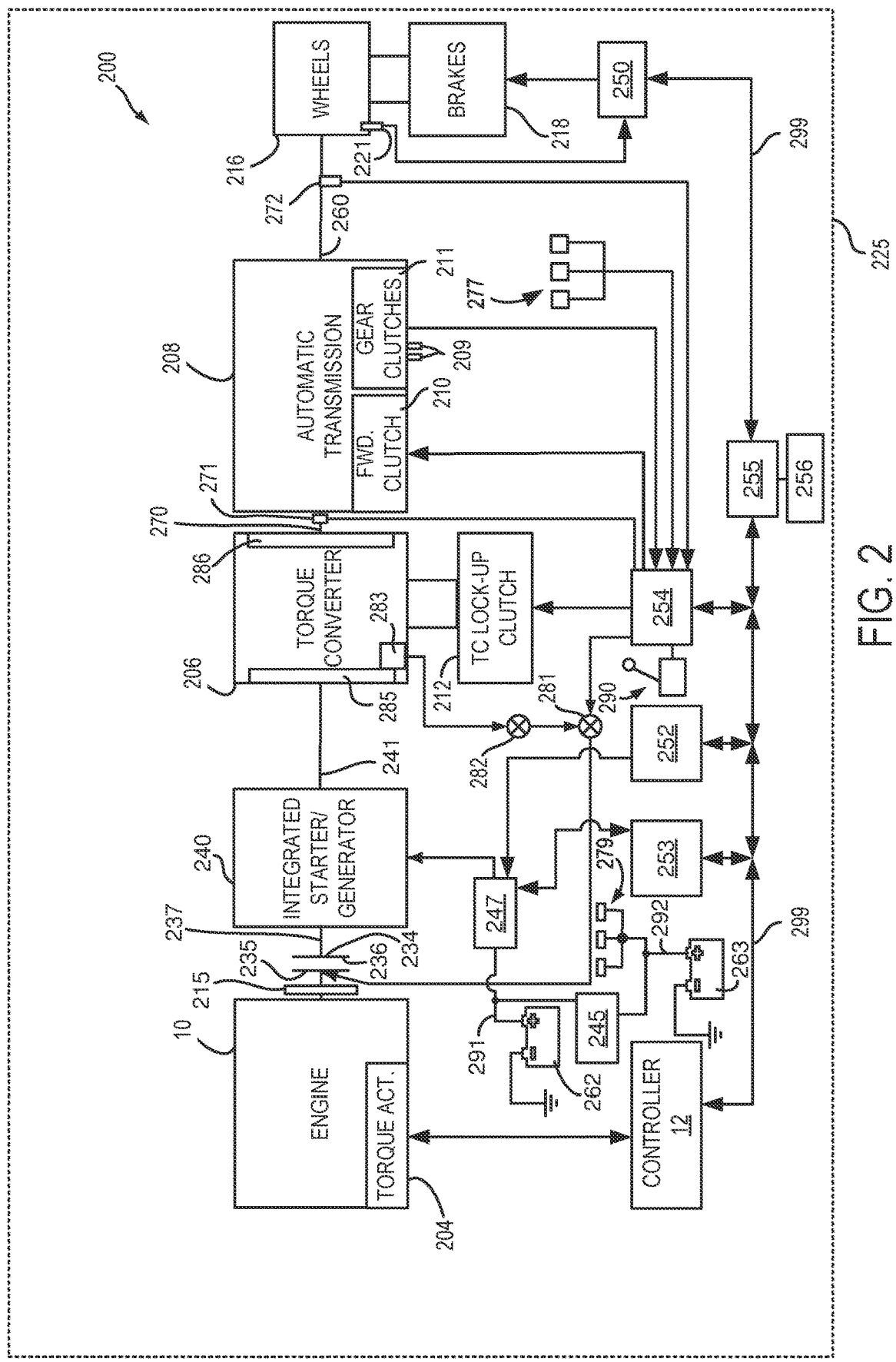
FIG. 2 shows example driveline for a hybrid vehicle.

FIG. 2 is a block diagram of a vehicle 225 including a powertrain or driveline 200. The powertrain of FIG. 2 includes engine 10 shown in FIG. 1. Powertrain 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source, which may be referred to as a traction battery) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a torque converter turbine 286 to output power to transmission input shaft 270. Transmission input shaft 270 mechanically couples torque converter 206 to automatic transmission 208. Torque converter 206 also includes a torque converter lock-up clutch 212

(TCC). Power is directly transferred from torque converter impeller 285 to torque converter turbine 286 when TCC is locked. TCC is electrically operated by transmission controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via torque converter impeller 285, which rotates at a same speed as ISG 240.

Automatic transmission 208 includes gear clutches 211 (e.g., gears 1-10) and forward clutch 210. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of transmission input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the transmission input shaft 270 responsive to a vehicle traveling condition before transmitting an output driving power to the wheels 216. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via brake controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG. Vehicle system controller 255 requests the engine power from controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from rotor and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, ISG temperature sensors, gear shift lever sensors, and an ambient temperature sensor. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if brake controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1-2B may provide for a vehicle system, comprising: a diesel engine including a selective catalytic reduction (SCR) catalyst included in an exhaust system of the diesel engine; and a controller including executable instructions stored in non-transitory memory that cause the controller to heat contents of the exhaust system in response to response to a vehicle being in an off state and an estimate of $NH_3$ stored in the SCR catalyst being less than a threshold amount of $NH_3$. In a first example, the vehicle system further comprises additional executable instructions to increase a flow through the SCR catalyst. In a second example that may include the first example, the vehicle system further comprises an electric machine to provide propulsive effort for a vehicle. In a third example that may include one or both of the first and second examples, the vehicle system includes where the flow through the SCR catalyst is increased via rotating the diesel engine via the electric machine. In a fourth example that may include one or more of the first through third examples, the vehicle system further comprises an electrically driven compressor and additional executable instructions to increase a flow through the SCR catalyst via activating the electrically driven compressor. In a fifth example that may include one or more of the first through fourth examples, the vehicle system further comprises a urea injector and additional instructions to inject urea to the exhaust system in response to response to the vehicle being in the off state and the estimate of $NH_3$ stored in the SCR catalyst being less than a threshold amount of $NH_3$. In a sixth example that may include one or more of the first through fourth examples, the vehicle system further comprises additional instructions cease injecting the urea to the exhaust system in response to $NH_3$ slip past the SCR catalyst.

Referring now to FIG. 3, an engine operating sequence is shown. The sequence of FIG. 3 is for a cylinder that has been deactivated (e.g., fuel flow to the cylinder has ceased) while one or more other engine cylinders are active and causing the engine to rotate (not shown). In addition, the engine's central throttle may be partially closed. The engine in this example does not include port throttles.

The sequence of FIG. 3 may be provided via the system of FIGS. 1 and 2 in cooperation with the method of FIG. 4. The plots of FIG. 3 are time aligned and occur at a same time. Vertical lines t0-t4 represent times of interest during the sequence. The engine system described herein may operate and include non-transitory instructions to operate at all the conditions 5 included in the description of FIG. 3.

The first plot from the top of FIG. 3 represents a vehicle operating state versus time. The vehicle operating state may be "on" or "off." An "on" vehicle operating state indicates that the vehicle is presently able to respond to driver requests for vehicle propulsion. An "off" vehicle operating state indicates that the vehicle is presently not able to respond to driver requests for vehicle propulsion. When the vehicle is in an "on" state, one or more of the vehicle's propulsion sources is ready to respond to driver input (e.g., human or autonomous driver input). When the vehicle is in the "off" state, the vehicle's propulsion sources are not ready and do not respond to driver input. The vehicle may transition between the "on" state and the "off" state based on driver input (e.g., a driver turning a key, pressing a pushbutton, or a driver or identification device entering/exiting a vicinity of the vehicle). In addition, the engine may transition from an "on" state to an "off" state responsive to vehicle speed and driver demand torque in vehicles that include automatic stopping and starting. The vehicle "on" state may include electric power being delivered to an inverter and/or an engine rotating and combusting fuel. The vehicle "off" state may include electric power being withheld from an inverter and/or electric machine (e.g., 240 of FIG. 2) and/or an engine not combusting fuel and rotating. The vertical axis represents the vehicle operating state. The horizontal axis represents time and time increases from the left side of the figure to the right side of the figure. Trace 302 represents vehicle operating state and the vehicle operating state is "off" when trace 302 is at a lower level that is near the horizontal axis. The vehicle operating state is "on" when trace 302 is at a higher level that is near the vertical axis arrow.

The second plot from the top of FIG. 3 is a plot of an amount of $NH_3$ that is stored within a SCR catalyst versus time. The vertical axis represents the amount of $NH_3$ that is stored in the SCR catalyst and the amount of $NH_3$ increases in the direction of the vertical axis arrow. The horizontal axis represents time and time increases from the left side of the plot to the right side of the plot. Horizontal line 350 represents a desired amount of $NH_3$ to be stored in the SCR catalyst to prepare the engine for restarting. Trace 304 represents the amount of $NH_3$ that is stored in the SCR catalyst.

The third plot from the top of FIG. 3 is a plot of SCR catalyst temperature versus time. The vertical axis represents the SCR catalyst temperature and the SCR catalyst temperature increases in the direction of the vertical axis arrow. The horizontal axis represents time and time increases from the left side of the plot to the right side of the plot. Horizontal line 352 represents an upper SCR catalyst temperature threshold and horizontal line 354 represents a lower SCR catalyst temperature threshold. Trace 306 represents the SCR catalyst temperature.

The fourth plot from the top of FIG. 3 is a plot of urea injection state versus time. The vertical axis represents the urea injection state and urea is being injected when trace 308 is at a higher level that is near the vertical axis arrow. Urea is not being injected when trace 308 is at a lower level that is near the horizontal axis. The horizontal axis represents time and time increases from the left side of the plot to the right side of the plot. Trace 308 represents the urea injection state.

The fifth plot from the top of FIG. 3 is a plot of SCR catalyst heater state versus time. The vertical axis represents the SCR catalyst heater state and the heater is activated when trace 310 is at a higher level that is near the vertical axis arrow. The heater is not activated when trace 310 is at a lower level that is near the horizontal axis. The horizontal axis represents time and time increases from the left side of the plot to the right side of the plot. Trace 310 represents the SCR catalyst heater state.

The sixth plot from the top of FIG. 3 is a plot of electrically driven compressor state versus time. The vertical axis represents the electrically driven compressor state and the electrically driven compressor is activated when trace 312 is at a higher level that is near the vertical axis arrow. The electrically driven compressor is not activated when trace 312 is at a lower level that is near the horizontal axis. The horizontal axis represents time and time increases from the left side of the plot to the right side of the plot. Trace 312 represents the electrically driven compressor state.

The seventh plot from the top of FIG. 3 is a plot of EGR valve state versus time. The vertical axis represents the EGR valve state and the EGR valve state is activated when trace 314 is at a higher level that is near the vertical axis arrow. The EGR valve is not activated when trace 314 is at a lower level that is near the horizontal axis. The horizontal axis represents time and time increases from the left side of the plot to the right side of the plot. Trace 314 represents the EGR valve state.

At time t0, the vehicle is activated and parked in an idle state. The EGR valve is open and EGR is flowing to the engine cylinders. The amount of $NH_3$ that is stored in the SCR catalyst is low. The temperature of the SCR catalyst is above horizontal line 352 (upper threshold limit) so urea is not injected to the SCR catalyst. The SCR catalyst heater is not activated and the electrically driven compressor is not activated. Such conditions may be present following a time when the engine is operated at a high load.

At time t1, the vehicle is turned off so that the engine is off and not rotating. The EGR valve is closed since SCR temperature is high. The electrically driven compressor is not activated and the amount of $NH_3$ that is stored in the SCR catalyst is unchanged. The temperature of the SCR catalyst is above horizontal line 352 (upper threshold limit) so urea is not injected to the SCR catalyst. Higher SCR catalyst temperatures may not be desirable for enhancing an amount of $NH_3$ stored in the SCR catalyst. In addition, the SCR catalyst heater is deactivated.

At time t2, the vehicle remains off and SCR catalyst temperature falls below horizontal line 352 (upper threshold dosing temperature limit) while the stored amount of $NH_3$ is less than the level or horizontal line 350. Therefore, urea injection is enabled and the compressor is activated to drive flow through the SCR catalyst. The EGR valve is fully opened to flow air from the intake to the exhaust. The SCR catalyst heater remains off since the SCR catalyst temperature is within the range defined by horizontal line 352 and horizontal line 354.

At time t3, the vehicle remains off and the SCR catalyst temperature falls to the level of horizontal line 354 (lower threshold dosing temperature limit) while the stored amount of $NH_3$ is less than the level or horizontal line 350. As such, the SCR catalyst heater is activated while urea injection is enabled. The compressor remains activated and the EGR valve remains fully opened. The SCR catalyst heater is cycled on and off to ensure that SCR catalyst temperature remains above horizontal line 354.

At time t4, the vehicle remains off and the stored amount of $NH_3$ reaches horizontal line 350 (a threshold amount of stored $NH_3$) so urea injection is ceased. In addition, the compressor is deactivated and the SCR catalyst heater is deactivated. The EGR valve is fully closed. The SCR catalyst is now prepared for converting NOx emissions the next time that the engine is restarted. The SCR catalyst temperature gradually falls after time t4.

In this way, an operating state of an SCR catalyst may be adjusted after an engine is stopped so that the SCR catalyst is prepared to convert NOx the next time that the engine is started. By adjusting the operating state of the SCR catalyst while the vehicle is off allows the operating state to be adjusted during conditions when there may not be time to adjust the SCR catalyst operating state while the engine is running.

Referring now to FIGS. 4, a method for operating an engine is shown. In particular, a flowchart of a method for operating a vehicle that includes a SCR catalyst is shown. The method of FIG. 4 may be stored as executable instructions in non-transitory memory in a system such as shown in FIGS. 1 and 2. The method of FIG. 4 may be incorporated into and may cooperate with the systems of FIGS. 1 and 2. Further, at least portions of the method of FIG. 4 may be incorporated as executable instructions stored in non-transitory memory while other portions of the method may be performed via a controller transforming operating states of devices and actuators in the physical world. The controller may employ engine actuators of the engine system and electric machines to adjust vehicle operation according to the method described below. Further, method 400 may determine selected control parameters from sensor input.

At 402, method 400 determines vehicle operating conditions. Vehicle operating conditions may include but are not limited to engine temperature, driver demand pedal position, SCR catalyst temperature, ambient temperature, engine air flow, ambient pressure, driver demand torque, engine speed, and engine load. Vehicle operating conditions may be determined via vehicle sensors and the engine controller described in FIG. 1. Method 400 proceeds to 404.

At 404, method 400 judges if the vehicle is in an "off" state. The vehicle may be in an "off" state when the vehicle is not prepared to be propelled via one of the vehicle's propulsion sources. Thus, the vehicle may be off when electric power is not provided to an electric machine that propels the vehicle and when the vehicle's internal combustion engine is not combusting fuel. If method 400 judges that the vehicle is "off," the answer is yes and method 400 proceeds to 406. Otherwise, the answer is no and method 400 proceeds to 430.

At 430, method 400 delivers urea to an SCR catalyst according to an amount of $NH_3$ that is stored in the SCR catalyst and other vehicle operating conditions. In addition, method 400 may cease injection of urea when the vehicle is commanded off, but before the vehicle is actually turned off. Method 400 proceeds to exit.

At 406, method 400 judges whether or not an amount of $NH_3$ that is stored in the SCR catalyst is greater than a threshold amount of $NH_3$. The threshold amount of $NH_3$ may be based on a predicted ambient temperature a next time that the engine is started. In one example, the ambient temperature predicted for the next engine start may be based on a predetermined amount of engine off time (e.g., 12 hrs) and weather forecast data that has been received by the vehicle. The predicted ambient temperature may then be input to an engine model that outputs a predicted engine temperature. The predicted engine temperature may then be applied to reference a table or function of empirically determined values of desired amounts of $NH_3$ to be stored in the SCR catalyst. The amounts in the table may be determined via conducting engine cold starts with various levels of $NH_3$ stored in the SCR catalyst and recording tailpipe emissions values. The minimum amount of $NH_3$ stored in the SCR catalyst that provides a desired level of emissions may be saved in the table or function. The output of the table or function is the threshold amount of $NH_3$ to be stored in the SCR catalyst for the next engine start.

Method 400 may estimate the present amount of $NH_3$ that is stored in the SCR catalyst via a model. In one example, the amount of $NH_3$ stored in the SCR catalyst is estimated according to a model that may be expressed via the following equations:

$$\begin{bmatrix} \dot{C}_{NO} \\ \dot{\theta} \\ \dot{C}_{NH3} \end{bmatrix} = \begin{bmatrix} -\frac{C_{NO}}{V_{cat}}(\overline{R}_{RED}\theta + F) + \frac{\overline{R}_{OX}}{V_{cat}}\theta \\ -\frac{\theta}{\Theta_{SC}}(\overline{R}_{ADS}C_{NH3} + \overline{R}_{DES} + \overline{R}_{RED}C_{NO} + \overline{R}_{OX}) + \frac{\overline{R}_{ADS}}{\Theta_{SC}}C_{NH3} \\ -\frac{C_{NH3}}{V_{cat}}(\overline{R}_{ADS}(1-\theta) + F) + \frac{\overline{R}_{DES}}{V_{cat}}\theta \end{bmatrix} + \begin{bmatrix} 0 \\ 0 \\ \frac{F}{V_{cat}} \end{bmatrix} U + \begin{bmatrix} \frac{F}{V_{cat}} \\ 0 \\ 0 \end{bmatrix} d$$

Note that the $R_{xx}$ values are multiplied times concentrations and flow to make units match; Theta ($\theta$) is $NH_3$ storage, $\theta_{SC}$ is SCR storage capacity.

If method 400 judges that the amount of $NH_3$ stored in the SCR catalyst is >=the threshold amount of $NH_3$, the answer is yes and method 400 proceeds to 440. Otherwise, the answer is no and method 400 proceeds to 408.

At 440, method 400 ceases injecting urea to the SCR catalyst if urea is being injected to the SCR catalyst. Method 400 proceeds to exit.

At 408, method 400 judges if a temperature of the SCR catalyst is greater than a high threshold temperature. In one example, the high threshold temperature may be a temperature above which the SCR catalyst capacity to store $NH_3$ declines. If method 400 judges that the SCR catalyst temperature is greater than the high threshold temperature, the answer is yes and method 400 proceeds to 450. Otherwise, the answer is no and method 400 proceeds to 410.

At 450, method 400 waits for the SCR catalyst to cool to a temperature that is below the high threshold temperature. Alternatively, method 400 may enter a sleep mode (e.g., a low activity mode) while the vehicle is off and schedule to the controller to wake or reactivate to a higher activity mode at a time that is based on a time that the SCR catalyst is predicted to be less than the high threshold temperature. Method 400 proceeds to 410 when the temperature of the SCR catalyst is less than the high threshold temperature.

At 410, method 400 judges if a temperature of the SCR catalyst is less than or equal to a lower threshold temperature. In one example, the lower threshold temperature (e.g., 180 degrees Celsius) may be a temperature below which it may be difficult for the injected urea to decompose to $NH_3$. If method 400 judges that the SCR catalyst temperature is less than or equal to the low threshold temperature, the answer is yes and method 400 proceeds to 460. Otherwise, the answer is no and method 400 proceeds to 412.

At 460, method 400 increases flow (e.g., air and/or exhaust flow) to the SCR catalyst and method 400 activates a heater to warm flow through the SCR catalyst. Activating the heater may ensure that the injected urea decomposes to $NH_3$. The flow through the SCR catalyst may be increased by motoring engine 10 or activating and rotating an electrically driven compressor. In addition, method 400 may open an engine throttle to increase flow through the engine and activate a urea heater to improve urea distribution. Method 400 proceeds to 414.

At 412, method 400 increases flow (e.g., air and/or exhaust flow) to improve dispersal of urea that is injected into the exhaust system to the SCR catalyst. The flow through the SCR catalyst may be increased by motoring engine 10 or activating and rotating an electrically driven compressor. In addition, method 400 may open an engine throttle to increase flow through the engine. Method 400 proceeds to 414.

At 414, method 400 begins injecting urea to the SCR catalyst and exhaust system. Method 400 proceeds to 416.

At 416, method 400 judges whether or not $NH_3$ slip past the SCR catalyst has been detected. In one example, method 400 may determine $NH_3$ is present based on output of a NOx sensor. If method 400 judges that $NH_3$ slip is present, the answer is yes and method 400 proceeds to 470. Otherwise, the answer is no and method 400 proceeds to 418.

At 470, method 400 reduces the amount of urea that is injected to the SCR catalyst. Method 400 returns to 416.

At 418, method 400 judges whether or not an amount of $NH_3$ that is stored in the SCR catalyst is greater than a threshold amount of $NH_3$. If method 400 judges that the amount of $NH_3$ slip is greater than the threshold amount of $NH_3$, the answer is yes and method 400 proceeds to 420. Otherwise, the answer is no and method 400 returns to 408.

At 420, method 400 ceases injecting urea to the exhaust system and cease flow to the SCR via deactivating the compressor or ceasing to rotate the engine. Method 400 proceeds to exit.

In this way, an amount of $NH_3$ stored in a SCR catalyst after an engine is stopped may be controlled so that there may be a desired amount of $NH_3$ in the SCR catalyst the next time that the engine is started. By storing a threshold amount of $NH_3$ in the SCR catalyst, treatment of engine emissions may be improved.

Thus, the method of FIG. 4 provides for a vehicle operating method, comprising: via a controller, supplying urea to a selective catalytic reduction (SCR) catalyst in response to a vehicle being in an off state and a temperature of the SCR catalyst being within a predetermined temperature range. In a first example, the vehicle operating method includes where the vehicle in the off state includes the vehicle not moving and an engine of the vehicle not combusting fuel. In a second example that may include the first example, the vehicle operating method further comprises increasing a flow through the SCR catalyst in response to the vehicle being in the off state and an estimate of $NH_3$ stored in the SCR catalyst being less than a threshold amount of $NH_3$. In a third example that may include one or both of the first and second examples, the vehicle operating includes where increasing the flow through the SCR catalyst includes rotating the engine via an electric machine. In a fourth example that may include one or more of the first through third examples, the vehicle operating method includes where increasing the flow through the SCR catalyst includes rotating a compressor. In a fifth example that may include one or more of the first through fourth examples, the vehicle operating method further comprises opening a throttle of the engine in response to the vehicle being in the off state and an estimate of $NH_3$ stored in the SCR catalyst being less than a threshold amount of $NH_3$. In a sixth example that may include one or more of the first through fifth examples, the vehicle operating method further comprises reducing flow of the urea to the SCR catalyst in response to an indication of $NH_3$ slip past the SCR catalyst. In a seventh example that may include one or more of the first through sixth examples, the vehicle operating method includes where the indication of $NH_3$ slip is provided via a NOx sensor.

The method of FIG. 4 also provides for a vehicle operating method, comprising: via a controller, adjusting a temperature of a selective catalytic reduction (SCR) catalyst in response to a vehicle being in an off state and a temperature of the SCR catalyst not being within a predetermined temperature range. In a first example, the vehicle method further comprises injecting urea to an exhaust system that includes the SCR in response to the temperature of the SCR catalyst being within the predetermined temperature range. In a second example that may include the first example, the vehicle method includes where adjusting the temperature of the SCR includes activating a heater in an exhaust system that includes the SCR. In a third example that may include one or both of the first and second examples, the vehicle method includes where adjusting the temperature includes increasing a flow through the SCR. In a fourth example that may include one or more of the first through third examples, the vehicle method further comprises rotating an engine via an electric machine to increase the flow through the SCR.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
   via a controller, supplying urea to a selective catalytic reduction (SCR) catalyst in response to a vehicle being in an off state and a temperature of the SCR catalyst being within a predetermined temperature range;
   increasing a flow through the SCR catalyst in response to the vehicle being in the off state and an estimate of $NH_3$ stored in the SCR catalyst being less than a threshold amount of $NH_3$ where increasing the flow through the SCR catalyst includes rotating the engine via an electric machine.

2. The vehicle operating method of claim 1, where the vehicle in the off state includes the vehicle not moving and an engine of the vehicle not combusting fuel.

3. The vehicle operating method of claim 1, further comprising opening a throttle of an engine in response to the vehicle being in the off state and an estimate of $NH_3$ stored in the SCR catalyst being less than a threshold amount of $NH_3$.

4. The vehicle operating method of claim 1, further comprising reducing flow of the urea to the SCR catalyst in response to an indication of $NH_3$ slip past the SCR catalyst.

5. The vehicle operating method of claim 4, where the indication of $NH_3$ slip is provided via a NOx sensor.

6. A vehicle system, comprising:
a diesel engine;
an electrically driven compressor;
a selective catalytic reduction (SCR) catalyst and a heater included in an exhaust system of the diesel engine; and
a controller including executable instructions stored in non-transitory memory that cause the controller to heat contents of the exhaust system via the heater in response to response to a vehicle being in an off state and an estimate of $NH_3$ stored in the SCR catalyst being less than a threshold amount of $NH_3$, and additional instructions to increase a flow through the SCR catalyst via activating the electrically driven compressor.

7. The vehicle system of claim 6, further comprising additional executable instructions to increase a flow through the SCR catalyst.

8. The vehicle system of claim 7, further comprising an electric machine to provide propulsive effort for a vehicle.

9. The vehicle system of claim 6, further comprising a urea injector and additional instructions to inject urea to the exhaust system in response to response to the vehicle being in the off state and the estimate of $NH_3$ stored in the SCR catalyst being less than a threshold amount of $NH_3$.

10. The vehicle system of claim 9, further comprising additional instructions that cease injecting urea to the exhaust system in response to $NH_3$ slip past the SCR catalyst.

11. A vehicle operating method, comprising:
via a controller, adjusting a temperature of a selective catalytic reduction (SCR) catalyst in response to a vehicle being in an off state and the temperature of the SCR catalyst not being within a predetermined temperature range; and
rotating an engine via an electric machine to increase the flow through the SCR catalyst.

12. The vehicle operating method of claim 11, further comprising injecting urea to an exhaust system that includes the SCR catalyst in response to the temperature of the SCR catalyst being within the predetermined temperature range.

13. The vehicle operating method of claim 11, where adjusting the temperature of the SCR catalyst includes activating a heater in an exhaust system that includes the SCR catalyst, and further comprising:
waking a controller from a sleep mode in response to the temperature of the SCR.

14. The vehicle operating method of claim 13, where adjusting the temperature includes increasing a flow through the SCR catalyst.

\* \* \* \* \*